(12) United States Patent
Matsuura et al.

(10) Patent No.: US 9,315,171 B2
(45) Date of Patent: Apr. 19, 2016

(54) WIPER DEVICE

(71) Applicants: TOYOTA JIDOSHA KABUSHIKI KAISHA, Toyota-shi (JP); ASMO CO., LTD., Kosai-shi (JP)

(72) Inventors: Akira Matsuura, Toyota (JP); Junya Nogami, Toyota (JP); Kei Hirata, Kosai (JP); Takashi Umeno, Kosai (JP); Masanori Takeuchi, Aichi-ken (JP)

(73) Assignees: TOYOTA JIDOSHA KABUSHIKI KAISHA, Toyota-shi (JP); ASMO CO., LTD., Kosai-shi (JP)

( * ) Notice: Subject to any disclaimer, the term of this patent is extended or adjusted under 35 U.S.C. 154(b) by 0 days.

(21) Appl. No.: 14/676,944

(22) Filed: Apr. 2, 2015

(65) Prior Publication Data

US 2015/0329084 A1 Nov. 19, 2015

(30) Foreign Application Priority Data

May 15, 2014 (JP) .................................. 2014-101270

(51) Int. Cl.
*B60S 1/34* (2006.01)

(52) U.S. Cl.
CPC ............... *B60S 1/3436* (2013.01); *B60S 1/345* (2013.01); *B60S 1/3447* (2013.01); *B60S 1/3481* (2013.01)

(58) Field of Classification Search
CPC .......... B60S 1/34; B60S 1/3436; B60S 1/345; B60S 1/3481
USPC ...................... 15/250.352, 250.351
See application file for complete search history.

(56) References Cited

U.S. PATENT DOCUMENTS 6,658,691 B2    12/2003    Muramatsu

FOREIGN PATENT DOCUMENTS

| FR | 2195957 | * | 2/1974 |
| JP | 2006-298146 | | 11/2006 |
| JP | 5596108 | * | 9/2014 |

* cited by examiner

*Primary Examiner* — Gary Graham
(74) *Attorney, Agent, or Firm* — Oblon, McClelland, Maier & Neustadt, L.L.P.

(57) ABSTRACT

A wiper device includes: a pivot shaft that rotates back and forth within a predetermined angular range; an arm head that is fixed to the pivot shaft; a cover that is mounted to the arm head; and a wiper arm that is pivotally supported on the arm head to come into and out of contact with a surface to be wiped. The wiper arm includes an engagement concave portion that extends in a longitudinal direction of the wiper arm at a side portion in a pivot direction of the wiper arm. The cover includes an engagement convex portion that extends in the longitudinal direction of the wiper arm. Relative movement of the wiper arm and the cover is restricted by engagement between an engagement wall portion of the engagement concave portion and the engagement convex portion.

7 Claims, 4 Drawing Sheets

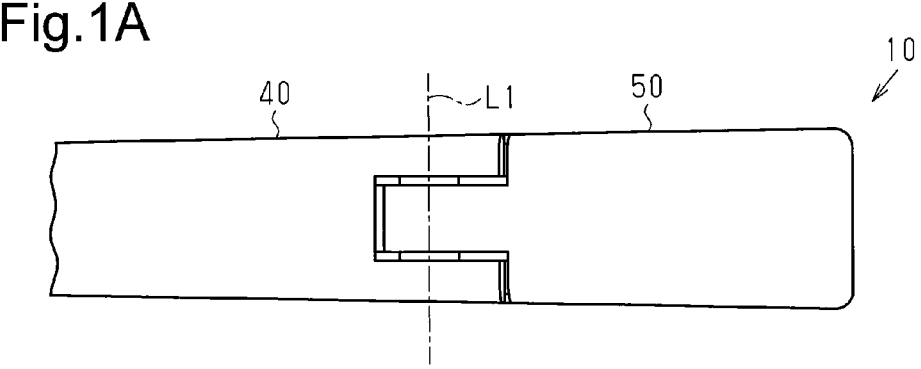
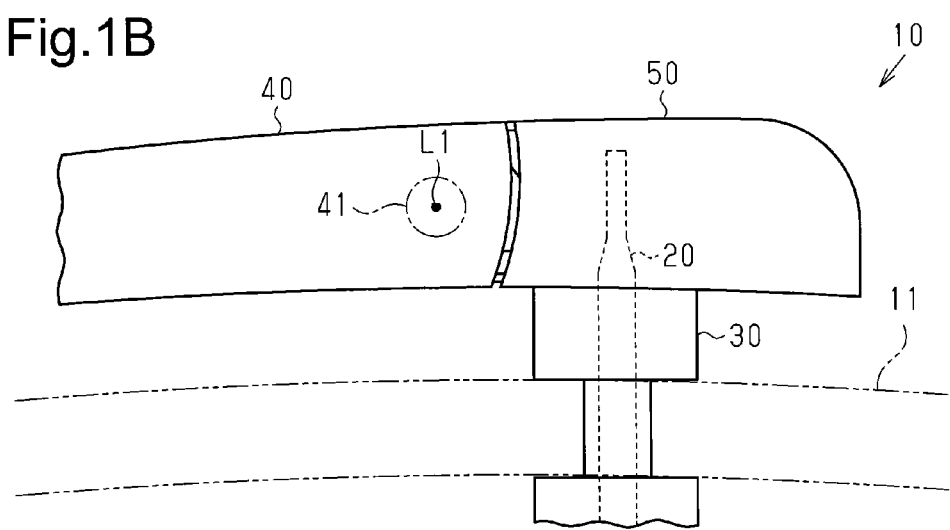
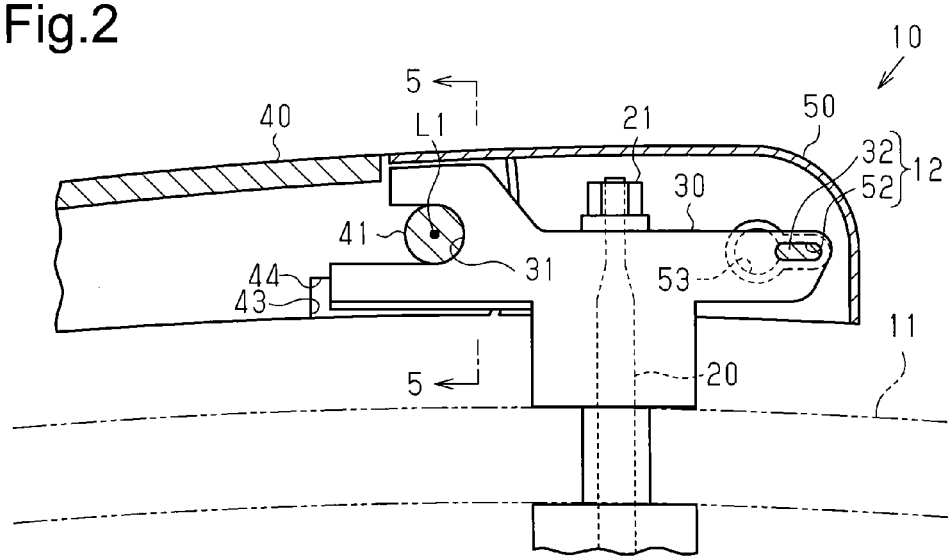

under pressure of water, or the like is swung in a direction away from the surface to be wiped unnecessarily. In view of this, the wiper device 10 is provided with a restriction portion 60 that restricts relative movement of the wiper arm 40 and the cover 50.

WIPER DEVICE

BACKGROUND OF THE INVENTION

The present invention relates to a wiper device.

Vehicles such as automobiles are provided with wiper devices for wiping water droplets or the like adhering to a window glass surface. A wiper device includes a wiper motor, a pivot shaft connected to the wiper motor, an arm head fixed to the pivot shaft, and a wiper arm attached to the arm head. When the wiper motor is driven, the pivot shaft rotates back and forth within a predetermined angular range.

Normally, the wiper arm is mounted to be pivotal with respect to the arm head. The wiper arm pivots with respect to the arm head to be switched between a state in which it is adjacent to the surface to be wiped and a state in which it is away from the glass surface.

Japanese Patent Laid-Open No. 2006-298146 proposes a configuration for restricting the pivoting of the wiper arm in a direction away from the surface to be wiped. In the configuration disclosed in Japanese Patent Laid-Open No. 2006-298146, a cover is mounted to the arm head. A stopper that restricts the pivoting of the wiper arm is integrally formed on an inner surface of the cover. The stopper projects to a front side of a swing direction of the wiper arm from the inner surface of the cover. In accordance with the configuration, when the wiper arm is swung in the direction away from the surface to be wiped, the stopper of the cover comes into abutment against the wiper arm. The above-mentioned pivoting of the wiper arm is thereby restricted.

However, in some cases, a sufficient space cannot be ensured for the stopper at the above-mentioned position on the inner surface of the cover depending on a cover shape or an arrangement form. In this case, it becomes difficult to restrict the pivoting of the wiper arm.

SUMMARY OF THE INVENTION

The wiper device includes: a pivot shaft that rotates back and forth within a predetermined angular range; an arm head that is fixed to the pivot shaft; a cover that is mounted to the arm head; and a wiper arm that is pivotally supported on the arm head to come into and out of contact with a surface to be wiped. The wiper arm includes a first engagement portion that extends in a longitudinal direction of the wiper arm at a side portion in a pivot direction of the wiper arm. The cover includes a second engagement portion that extends in the longitudinal direction of the wiper arm. The wiper device includes a restriction portion that restricts relative movement of the wiper arm and the cover by engagement between the first engagement portion and the second engagement portion.

BRIEF DESCRIPTION OF THE DRAWINGS

FIG. 1A is a plan view of a wiper device according to one embodiment of the present invention;
FIG. 1B is a side view of the wiper device;
FIG. 2 is a sectional view illustrating a region around an arm head of the wiper device in an enlarged scale.

DETAILED DESCRIPTION OF THE PREFERRED EMBODIMENT

Figure 3A:
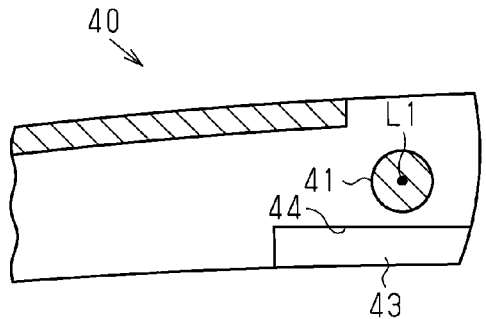
FIG. 3A is a partial sectional view of a wiper arm.

In the following, one embodiment in which a wiper device of the present invention is embodied is described by reference to FIGS. 1 to 8C.

As illustrated in FIGS. 1A, 1B, and 2, a wiper device 10 is attached to a vehicle back door 11. The wiper device 10 wipes a window glass surface of the back door 11.

The wiper device 10 includes a pivot shaft 20 that rotates back and forth within a predetermined angular range. An actuator (not shown) is arranged within the back door 11. The pivot shaft 20 is connected to the actuator. A distal end of the pivot shaft 20 projects out of the back door 11. A male thread is formed on the distal end of the pivot shaft 20. By fastening a nut 21 to the distal end of the pivot shaft 20, an arm head 30 is fixed to the pivot shaft 20, and rotates back and forth within a predetermined angular range together with the pivot shaft 20.

Figure 3B:
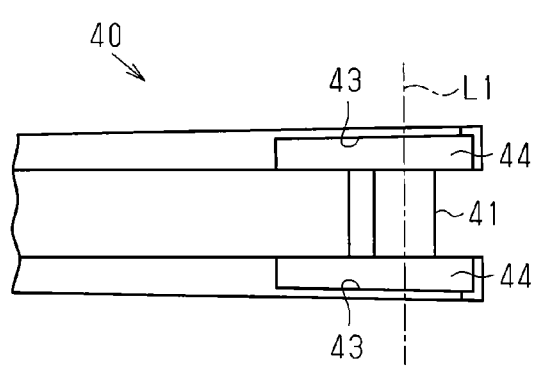
FIG. 3B is a partial bottom view of the wiper arm.

A wiper arm 40 is attached to the arm head 30 to come into and out of contact with the glass surface that is a surface to be wiped of the back door 11. Specifically, a support shaft 41 is arranged within the wiper arm 40 as illustrated in FIGS. 3A and 3B. The support shaft 41 has a circular shape in section, and linearly extends. The support shaft 41 extends in a direction perpendicular to a longitudinal direction of the wiper arm 40. Also, the support shaft 41 extends in a direction substantially parallel to the surface of the back door 11 illustrated in FIG. 2.

As illustrated in FIG. 2, a support groove 31 that rotationally supports the support shaft 41 is formed in the arm head 30. The support groove 31 also extends in the direction perpendicular to the longitudinal direction of the wiper arm 40. Also, the support groove 31 extends in the direction substantially parallel to the surface of the back door 11.

The support shaft 41 of the wiper arm 40 is accommodated within the support groove 31 of the arm head 30. Accordingly, the wiper arm 40 is supported on the arm head 30 to be pivotal about an axis L1 of the support shaft 41. The wiper arm 40 pivots about the axis L1 of the support shaft 41 to be switched between a state in which it is adjacent to the back door 11 and a state in which it is away from the back door 11. In the following, the axis L1 of the support shaft 41 is referred to as a pivot axis L1.

A spring member composed of a tension spring (not shown) is arranged between the arm head 30 and the wiper arm 40. When the spring member is in a wiping position illustrated in FIG. 2, the spring member urges the support shaft 41 in a direction in which the support shaft 41 is pressed against a bottom portion of the support groove 31, and also urges the wiper arm 40 in a direction in which the wiper arm 40 is pressed against the surface to be wiped. That is, the spring member urges the wiper arm 40 to prevent the wiper arm 40 from escaping from the arm head 30.

A cover 50 is mounted to the arm head 30. The cover 50 is formed to cover substantially the entire arm head 30 from a vehicle outer side. The cover 50 has a function to improve the appearance of the wiper device 10 by substantially concealing the arm head 30 from outside.

For example, when a vehicle is washed by using a car washing machine, there is a possibility that the wiper arm 40 will pivot, upon contact with a brush of the car washing machine, and the wiper arm 40 may be caught in the brush and damaged. To prevent the problem, it is necessary to disable the pivoting of the wiper arm 40. In view of the point, the wiper device 10 is configured to be switchable between a pivot-enabled state, in which the pivoting of the wiper arm 40 is enabled, and a pivot-restricted state, in which the pivoting of the wiper arm 40 is restricted.

In the following, the above-mentioned wiper device 10 is described in detail by reference to FIGS. 3A to 6.

As illustrated in FIGS. 3A and 3B, a portion of the wiper arm 40 close to the arm head 30 is formed substantially in a U-shaped cross section that is open toward the back door 11, which is located in a lower portion in FIG. 3A. An engagement concave portion 43 is formed in each of opposite side portions in a pivot direction of the wiper arm 40. Each of the engagement concave portions 43 is arranged at an end portion close to the arm head 30 on an inner surface of the wiper arm 40. Each of the engagement concave portions 43 extends linearly along the longitudinal direction of the wiper arm 40.

Figure 4A:
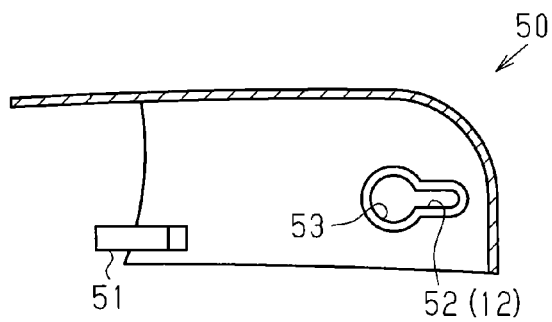
FIG. 4A is a sectional side view of a cover.
Figure 4B:
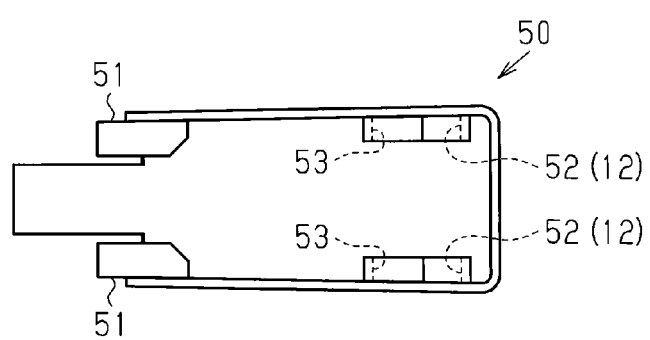
FIG. 4B is a bottom view of the cover.

As illustrated in FIGS. 4A and 4B, a portion of the cover 50 close to the arm head 30 is formed in a substantially U shape in section to open toward the back door 11 that is located in a lower portion in FIG. 4A. An engagement convex portion 51 is formed on each of opposite side portions in a pivot direction of the cover 50. Each of the engagement convex portions 51 is formed at an end portion close to the wiper arm 40 on an inner surface of the cover 50. Each of the engagement convex portions 51 is formed in a square shape in cross section and extends along the longitudinal direction of the wiper arm 40.

Figure 5:
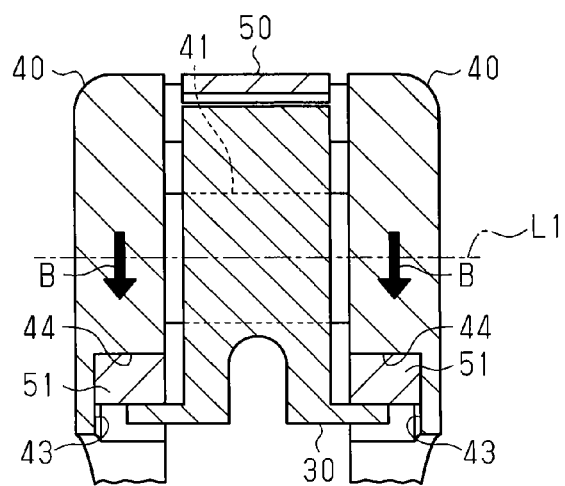
FIG. 5 is a sectional view taken along a line 5-5 in FIG. 2.
Figure 6:
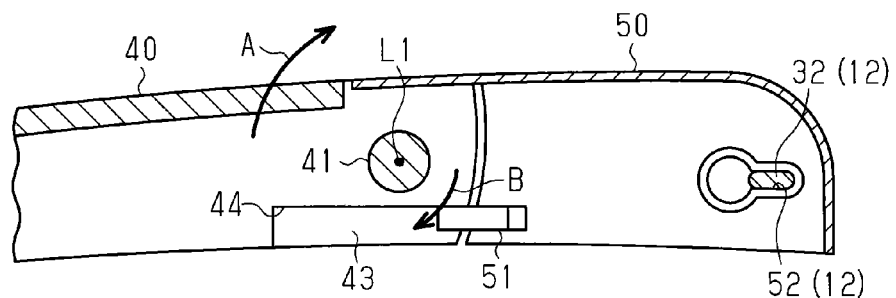
FIG. 6 is a sectional view illustrating an engagement state between an engagement wall portion of the wiper arm and an engagement convex portion of the cover.

The wiper device 10 is configured to restrict the pivoting of the wiper arm 40 with respect to the arm head 30 by engaging the engagement convex portions 51 of the cover 50 with the engagement concave portions 43 of the wiper arm 40 as illustrated in FIGS. 5 and 6. Specifically, engagement wall portions 44 constituting the engagement concave portions 43 and extending along the pivot axis L1 are engaged with the engagement convex portions 51 of the cover 50, so that the pivoting of the wiper arm 40 is restricted. In the present embodiment, the engagement wall portion 44 corresponds to a first engagement portion, and the engagement convex portion 51 corresponds to a second engagement portion.

In the following, an operation obtained by engaging together the engagement concave portions 43 of the wiper arm 40 and the engagement convex portions 51 of the cover 50 is described by reference to FIGS. 2, 5, and 6.

The wiper arm 40 is swung from a position illustrated in FIG. 2 in a direction away from the surface to be wiped of the back door 11. At this time, the wiper arm 40 pivots about the axis L1 of the support shaft 41 as indicated by the arrow A in FIG. 6. A portion of the wiper arm 40 between the support shaft 41 and the arm head 30 moves toward the back door 11 as indicated by the arrows B in FIGS. 5 and 6.

As described above, the engagement wall portions 44 that extend along the pivot axis L1 of the wiper arm 40 are formed on the inner surfaces of the wiper arm 40. The engagement convex portions 51 of the cover 50 are arranged at a front side of the engagement wall portions 44. Therefore, when the wiper arm 40 is swung in the direction away from the surface to be wiped of the back door 11, the engagement wall portions 44 of the wiper arm 40 abut against the engagement convex portions 51 of the cover 50. The engagement convex portions 51 are thereby engaged with the engagement concave portions 43, so that the pivoting of the wiper arm 40 with respect to the arm head 30 is restricted. Consequently, the pivoting of the wiper arm 40 in the direction away from the surface to be wiped is restricted.

The support shaft 41 of the wiper arm 40 and the support groove 31 of the arm head 30 are arranged on a front side of the pivot direction on the inner surface of the cover 50. Thus, it is not possible to ensure sufficient space at the above-mentioned position on the inner surface of the cover 50. It is thus difficult to form a stopper for restricting the pivoting of the wiper arm 40 in the direction away from the surface to be wiped of the back door 11 on the inner surface of the cover 50.

In this regard, the wiper device 10 includes a restriction portion that restricts the pivoting of the wiper arm 40 at each of the opposite side portions in the pivot direction of the wiper arm 40, more specifically, on each of a left side and a right side in FIG. 5. Each of the restriction portions is composed of the engagement wall portion 44 and the engagement convex portion 51. Each of the restriction portions restricts the pivoting of the wiper arm 40 in the direction away from the surface to be wiped. According to the configuration, even when a sufficient space cannot be ensured for the stopper on the front side of the pivoting direction on the inner surface of the cover 50, the pivoting of the wiper arm 40 in the direction away from the surface to be wiped can be effectively restricted by providing the restriction portion at the side portion in the pivot direction of the wiper arm 40.

Figure 7:
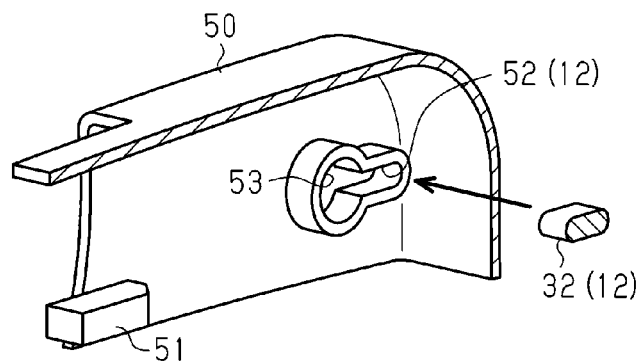
FIG. 7 is an exploded perspective view illustrating a guide convex portion of the arm head and a guide groove of the cover in an enlarged scale.

As illustrated in FIGS. 2 and 7, the wiper device 10 includes a guide mechanism 12 that guides the cover 50 in the longitudinal direction of the wiper arm 40. Specifically, a guide convex portion 32 projects from each of a pair of opposite side surfaces of the arm head 30 in the same direction as the pivot axis L1. The pair of guide convex portions 32 are arranged to be aligned on the same axial line on the opposite side surfaces of the arm head 30. A projecting end of each of the guide convex portions 32 extends linearly along the longitudinal direction of the wiper arm 40.

As illustrated in FIGS. 4A, 4B, and 7, a guide groove 52 is formed on each of a pair of opposite inner surfaces of the cover 50. Each of the guide grooves 52 is formed to be depressed in the same direction as the pivot axis L1. Each of the guide grooves 52 extends linearly along the longitudinal direction of the wiper arm 40 in a state in which the cover 50 covers the arm head 30 as illustrated in FIG. 2. Each of the guide grooves 52 is also formed at a position at which it is engageable with the corresponding guide convex portion 32. The guide mechanism 12 is composed of the two guide convex portions 32 and the two guide grooves 52.

Next, the operation of the above-mentioned guide mechanism 12 is described by reference to FIGS. 8A and 8B.

Figure 8A:
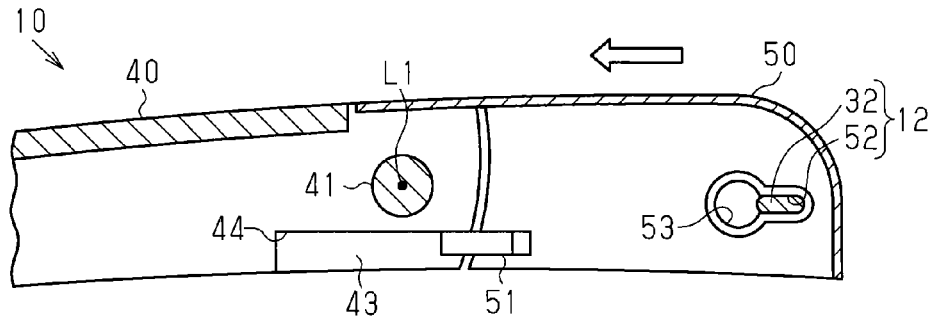
FIGS. 8A to 8C are sectional views illustrating a movement form of the cover.

As illustrated in FIG. 8A, the cover 50 is operated to move toward the wiper arm 40 in a state in which the guide convex portions 32 of the arm head 30 and the guide grooves 52 of the cover 50 are engaged together. At this time, the cover 50 moves toward the wiper arm 40 with the guide convex portions 32 guided by the guide grooves 52. By moving the cover 50 toward the wiper arm 40 as described above, the engagement convex portions 51 of the cover 50 are engaged with the engagement concave portions 43 of the wiper arm 40. As a result, the wiper device 10 is switched to the pivot-restricted state in which the pivoting of the wiper arm 40 in the direction away from the surface to be wiped is restricted.

Figure 8B:
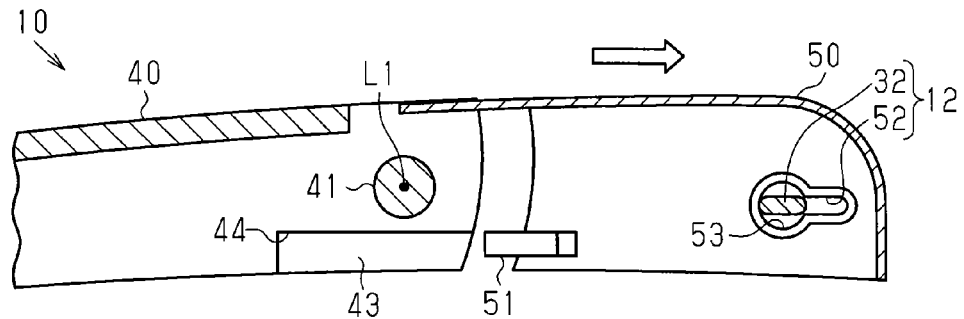

On the other hand, as illustrated in FIG. 8B, the cover 50 is operated to move away from the wiper arm 40 in a state in which the guide convex portions 32 of the arm head 30 and the guide grooves 52 of the cover 50 are engaged together. At this time, the cover 50 moves in a direction away from the wiper arm 40 with the guide convex portions 32 guided by the guide grooves 52. By moving the cover 50 away from the wiper arm 40 as described above, the engagement between the engagement concave portions 43 of the wiper arm 40 and the engagement convex portions 51 of the cover 50 is released. As a result, the wiper device 10 is switched to the pivot-enabled state in which the pivoting of the wiper arm in the direction away from the surface to be wiped is enabled.

As described above, the guide mechanism 12 can be configured by a simple structure in which the guide convex portions 32 of the arm head 30 are guided by the guide grooves 52 of the cover 50. Also, only by sliding the cover 50 by using the guide mechanism 12, the wiper device 10 can be switched between the pivot-restricted state and the pivot-enabled state.

The wiper device 10 is configured to move the cover 50 in a direction away from the wiper arm 40 and to rotate the cover 50. Specifically, a guide concave portion 53 is formed on each of the pair of inner surfaces of the cover 50 as illustrated in FIGS. 4A, 4B, and 7. Each of the guide concave portions 53 is formed to be depressed in the same direction as the pivot axis L1. An end portion of the guide groove 52 close to the wiper arm 40 communicates with each of the guide concave portions 53. Each of the guide concave portions 53 is formed in a circular shape in section as viewed from the direction of the pivot axis L1. As illustrated in FIG. 8B, each of the guide concave portions 53 is formed at a position at which it is engageable with the guide convex portion 32 of the arm head 30 in a state in which the cover 50 is moved away from the wiper arm 40. A diameter of each of the guide concave portions 53 is set to a dimension such that the guide convex portion 32 can rotate within the guide concave portion 53.

Next, an operation of the above-mentioned guide concave portions 53 is described by reference to FIGS. 8A to 8C.

Figure 8C:
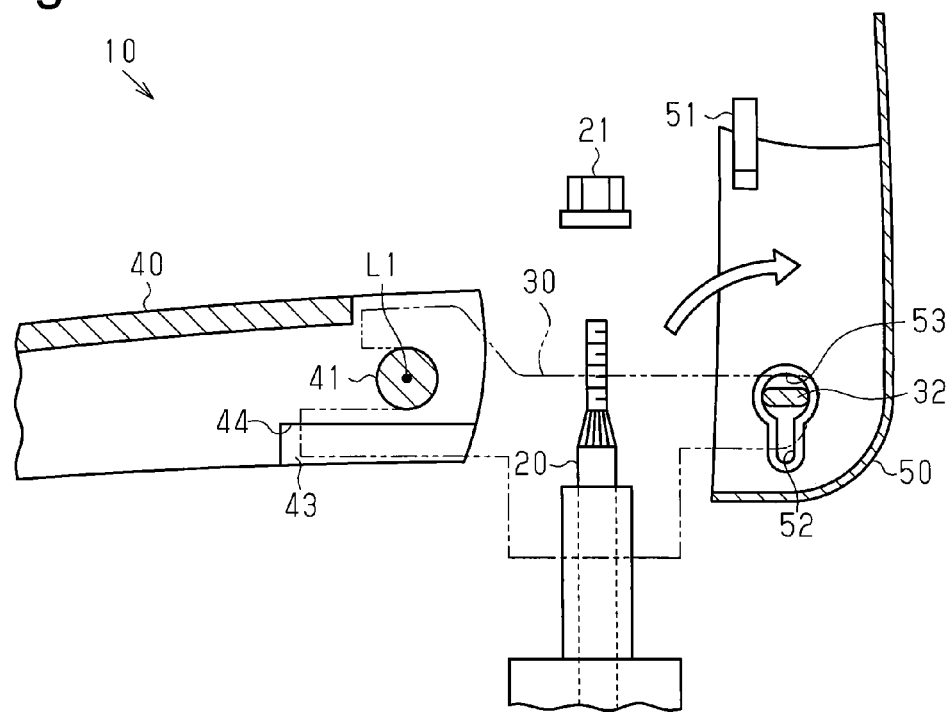

As illustrated in FIGS. 8A to 8C, the cover 50 is moved in the direction away from the wiper arm 40 until the guide convex portions 32 of the arm head 30 are completely accommodated within the guide concave portions 53 of the cover 50. Accordingly, the guide convex portions 32 come into a rotatable state within the guide concave portions 53. Subsequently, in this state, the cover 50 is rotated in a direction away from the arm head 30, that is, a clockwise direction in FIG. 8C about engagement portions between the guide convex portions 32 and the guide concave portions 53. An outer surface of the arm head 30 is thereby exposed to the outside as indicated by a broken line formed by a long dash alternating with two short dashes in FIG. 8C. Accordingly, the outer surface of the arm head 30 can be exposed to the outside with the cover 50 remaining attached to the arm head 30, and the arm head 30 can also be attached to the pivot shaft 20 by tightening the nut 21.

In this case, by rotating the cover 50 with respect to the arm head 30, and thereby moving the engagement convex portions 51 of the cover 50 away from the wiper arm 40, the wiper device 10 can be switched to the pivot-enabled state. However, in this case, since a portion where the arm head 30 is fixed to the pivot shaft 20 is visible from outside, the appearance of the wiper device 10 is not aesthetically pleasing. Also, the attachment state of the cover 50 becomes unstable, and the cover 50 is easily detached from the arm head 30.

In this regard, in the present embodiment, the cover 50 is moved in the direction away from the wiper arm 40 by using the guide mechanism 12, so that the wiper device 10 can be switched to the pivot-enabled state. In this case, as illustrated in FIG. 8B, the wiper device 10 can be switched to the pivot-enabled state while the cover 50 covers substantially the entire arm head 30. Therefore, the appearance of the wiper device 10 after the wiper device 10 is switched to the pivot-enabled state is improved, and the attachment state of the cover 50 also becomes stable.

Thus, the following effects are obtained according to the present embodiment.

(1) In some cases, a sufficient space cannot be ensured for the stopper on the front side of the pivot direction of the wiper arm 40 on the inner surface of the cover 50. Even in this case, the pivoting of the wiper arm 40 in the direction away from the surface to be wiped can be effectively restricted by providing the restriction portion at the side portion in the pivot direction of the wiper arm 40.

(2) Only by sliding the cover 50 by using the guide mechanism 12, the wiper device 10 can be switched between the pivot-restricted state and the pivot-enabled state.

(3) The guide mechanism 12 can be configured by the simple structure in which the guide convex portions 32 of the arm head 30 are guided by the guide grooves 52 of the cover 50.

(4) The outer surface of the arm head 30 can be exposed to the outside while the cover 50 remains attached to the arm head 30, and the arm head 30 can also be attached to the pivot shaft 20.

(5) The engagement wall portions 44 of the wiper arm 40 come into abutment against the engagement convex portions 51 of the cover 50, so that the pivoting of the wiper arm 40 in the direction away from the surface to be wiped of the back door 11 can be restricted.

The above-mentioned embodiment may be modified as described below.

The engagement convex portion may be formed on the wiper arm 40, and the engagement concave portion may be formed in the cover 50. Also, the engagement convex portions may be formed on both the wiper arm 40 and the cover 50, and the engagement convex portions may abut against each other to restrict the pivoting of the wiper arm 40. As long as the first engagement portion of the wiper arm 40 and the second engagement portion of the cover 50 are engaged together to restrict the pivoting of the wiper arm 40, each shape of the first engagement portion and the second engagement portion may be changed to any shape.

The guide concave portions 53 of the cover 50 may be omitted. In this case, the cover 50 can be moved along the longitudinal direction of the wiper arm 40 by using the guide mechanism 12 composed of the guide convex portions 32 of the arm head 30 and the guide grooves 52 of the cover 50. Accordingly, the wiper device 10 can be switched between the pivot-restricted state and the pivot-enabled state.

The guide groove may be formed on the arm head 30, and the guide convex portion may be formed on the cover 50 to constitute the guide mechanism. As long as the cover 50 is guided along the longitudinal direction of the wiper arm 40, any structure other than the structure in which the cover 50 is guided by the engagement between the groove and the convex portion may be employed.

The guide mechanism may be omitted. In this case, the wiper device can be switched to the pivot-restricted state by engaging together the first engagement portion of the arm head 30 and the second engagement portion of the cover 50, and fixing the cover 50 to the arm head 30.

The wiper device of the above-mentioned embodiment may be applied to a wiper device for other than the back door, such as a wiper device for a windshield and a wiper device for a headlight.

The invention claimed is:
1. A wiper device comprising:
a pivot shaft that rotates back and forth within a predetermined angular range;
an arm head that is fixed to the pivot shaft;
a cover that is mounted to the arm head;

a wiper arm that is pivotally supported on the arm head to come into and out of contact with a surface to be wiped; and a guide mechanism that guides movement of the cover in the longitudinal direction of the wiper arm, wherein the wiper arm includes a first engagement portion that extends in a longitudinal direction of the wiper arm at a side portion in a pivot direction of the wiper arm, the cover includes a second engagement portion that extends in the longitudinal direction of the wiper arm, a restriction portion of the wiper device, which is defined by the first engagement portion and the second engagement portion, restricts relative movement of the wiper arm and the cover by engagement between the first engagement portion and the second engagement portion, and the guide mechanism is composed of a guide groove that extends in the longitudinal direction of the wiper arm, and a guide convex portion that extends in the longitudinal direction of the wiper arm and is engaged with the guide groove, the guide groove is provided on one of the arm head and the cover, and the guide convex portion is provided on the other of the arm head and the cover.

2. The wiper device according to claim 1, further comprising a guide concave portion that is provided on the cover and is formed in a circular shape in section as viewed from a pivot axis direction of the wiper arm, wherein an end portion of the guide groove close to the wiper arm communicates with the guide concave portion.

3. The wiper device according to claim 1, wherein the first engagement portion is an engagement wall portion that is provided on the wiper arm and projects in a pivot axis direction of the wiper arm, and the second engagement portion is an engagement convex portion that is provided on the cover and is arranged on a front side of a pivot direction of the engagement wall portion.

4. A wiper device comprising:

a pivot shaft that rotates back and forth within a predetermined angular range;

an arm head that is fixed to the pivot shaft;

a cover that is mounted to the arm head;

a wiper arm that is pivotally supported on the arm head to come into and out of contact with a surface to be wiped; and a guide mechanism that guides movement of the cover with respect to the wiper arm in the longitudinal direction of the wiper arm, wherein the wiper arm includes a first engagement portion that extends in a longitudinal direction of the wiper arm at a side portion in a pivot direction of the wiper arm, the cover includes a second engagement portion that extends in the longitudinal direction of the wiper arm, a restriction portion of the wiper device, which is defined by the first engagement portion and the second engagement portion, restricts relative movement of the wiper arm and the cover by engagement between the first engagement portion and the second engagement portion, and the movement of the cover with respect to the wiper arm by the guide mechanism brings the first engagement portion into engagement with the second engagement portion such that the wiper arm is pivot-restricted and brings the first engagement portion out of engagement from the second engagement portion such that the wiper arm is pivot-enabled.

5. The wiper device according to claim 4, wherein the guide mechanism is composed of a guide groove that extends in the longitudinal direction of the wiper arm, and a guide convex portion that extends in the longitudinal direction of the wiper arm and is engaged with the guide groove, the guide groove is provided on one of the arm head and the cover, and the guide convex portion is provided on the other of the arm head and the cover.

6. The wiper device according to claim 5, further comprising a guide concave portion that is provided on the cover and is formed in a circular shape in section as viewed from a pivot axis direction of the wiper arm, wherein an end portion of the guide groove close to the wiper arm communicates with the guide concave portion.

7. The wiper device according to claim 4, wherein the first engagement portion is an engagement wall portion that is provided on the wiper arm and projects in a pivot axis direction of the wiper arm, and the second engagement portion is an engagement convex portion that is provided on the cover and is arranged on a front side of a pivot direction of the engagement wall portion.

* * * * *